Oct. 4, 1966  S. S. CLARK  3,276,740
VALVE
Filed Oct. 4, 1963  2 Sheets-Sheet 1
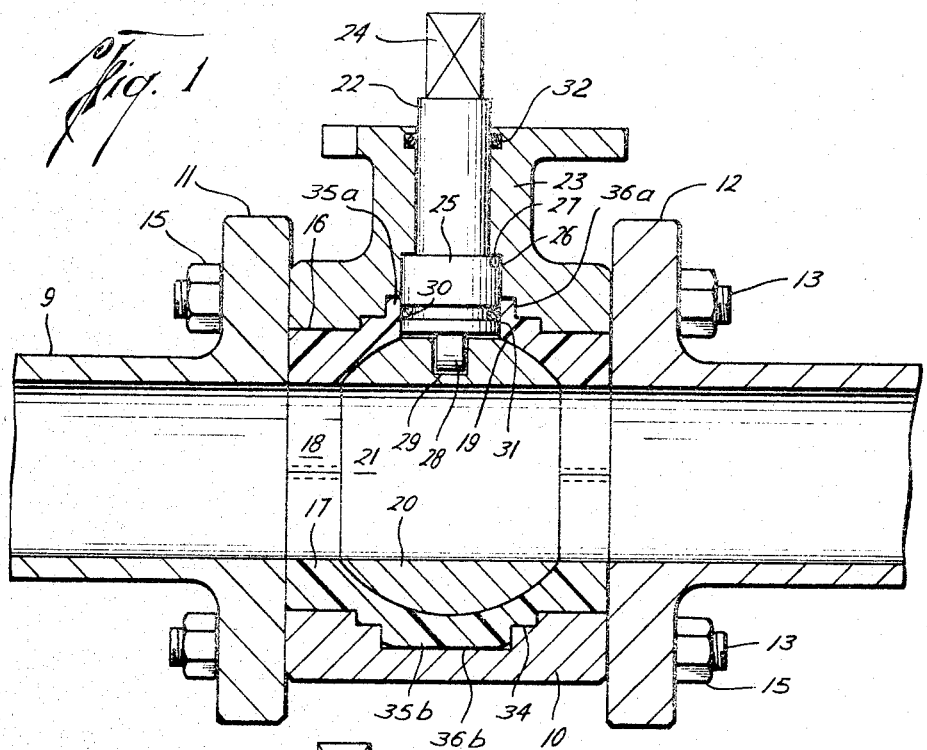
Fig. 1
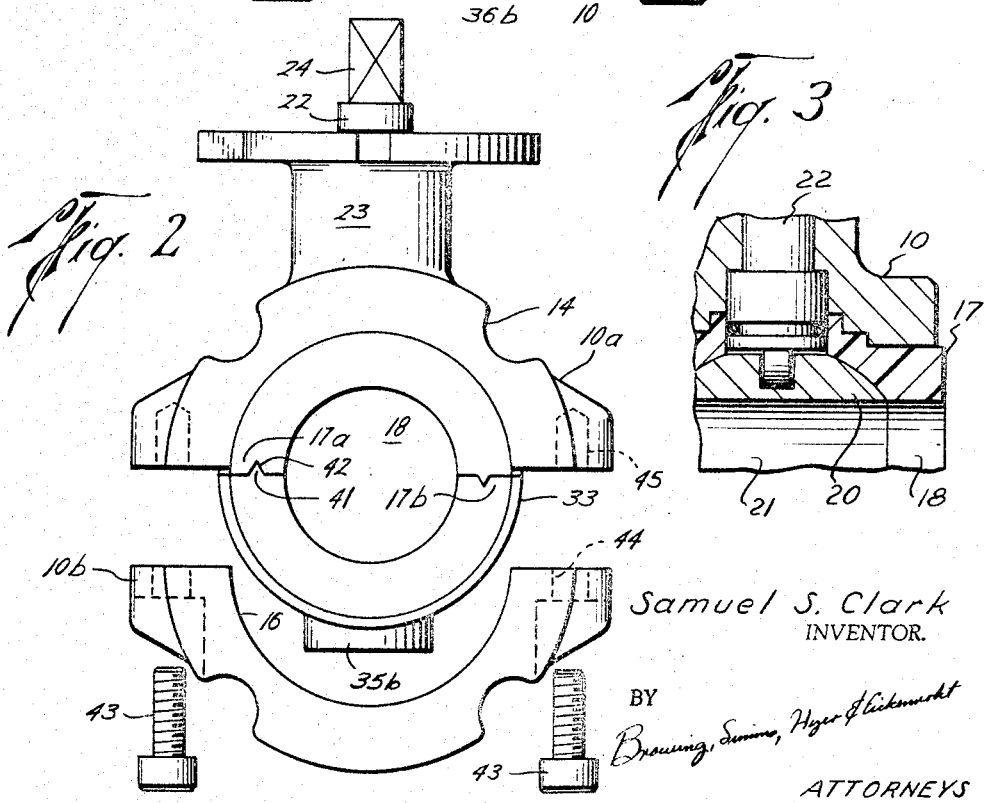
Fig. 2
Fig. 3
Samuel S. Clark
INVENTOR.
BY
ATTORNEYS

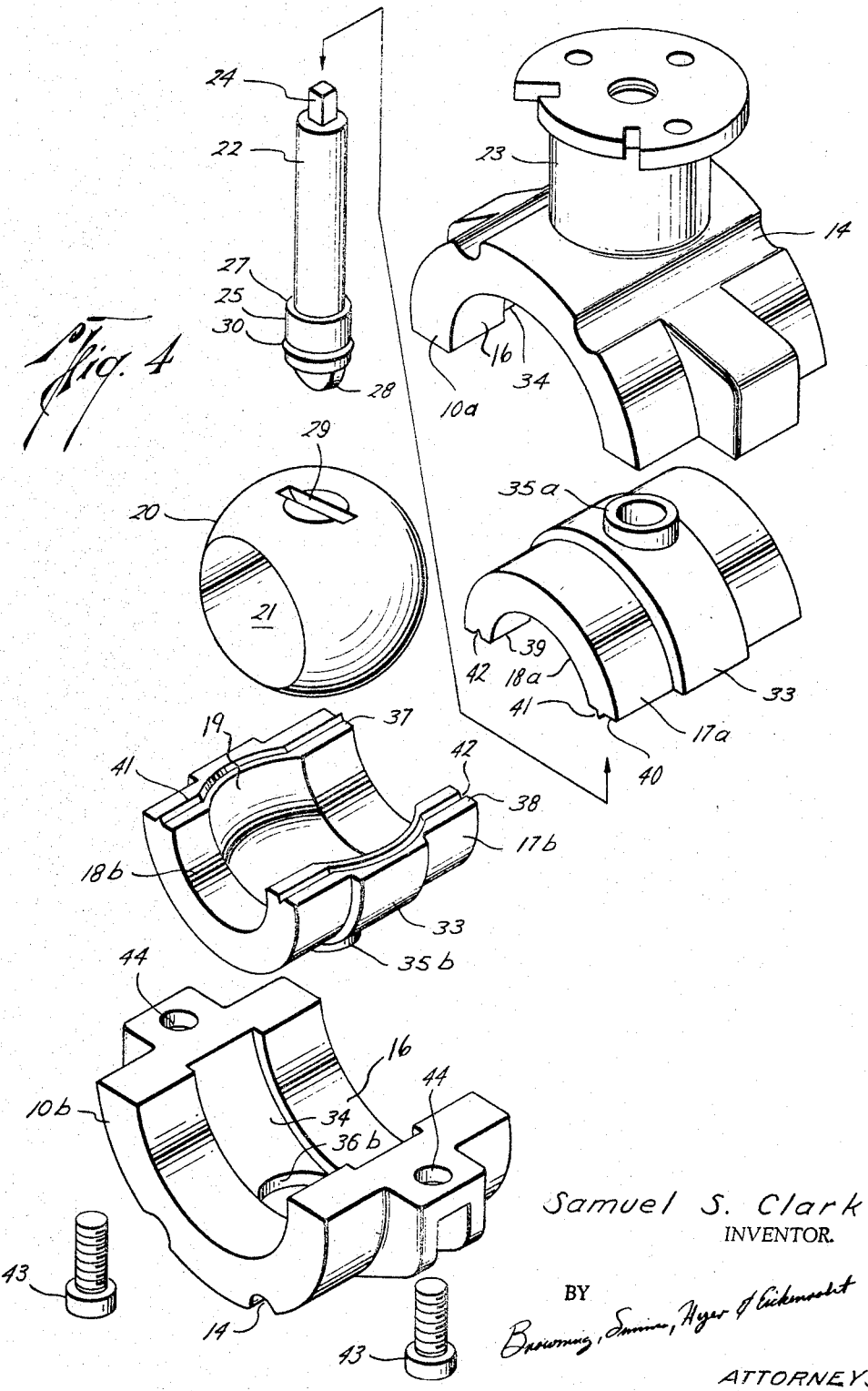

United States Patent Office 3,276,740
Patented Oct. 4, 1966

3,276,740
VALVE
Samuel S. Clark, Houston, Tex., assignor to Keystone
Valve Corp., Houston, Tex.
Filed Oct. 4, 1963, Ser. No. 313,853
8 Claims. (Cl. 251—315)

This invention relates to valves, generally, and more particularly, to valves of the type where the valve element is rotated 90° to open and close the valve.

Valves of this type are in general use throughout industry to control the flow of fluids through pipelines. These valves are usually of the full-open type which provide a flow-way through them approximately equal to the internal diameter of the pipeline in which they are installed. This characteristic plus the fact that the flowway through them is usually smooth and free of grooves, cavities, etc., makes these valves particularly useful in the food and beverage industries and in the handling of highly corrosive fluids where these characteristics are particularly desirable.

Since these valves are commonly used in the food and beverage industries, they not only need to be full-opening valves free of internal cavities, but they also need to be easily disassembled and reassembled so they can be quickly removed from the line, cleaned and reinstalled in the line in a minimum of time to thereby reduce the down time of these process lines. Further, for the handling of corrosive fluids there is a need for a valve of this type in which only the valve seat and valve member are exposed to the fluids carried by the valve to thereby allow the valve body and other parts to be made from less expensive, more easily machined, materials.

It is an object of this invention to provide a valve of the type described above in which only the valve seat and the valve member are exposed to the fluids flowing through the valve.

It is another object of this invention to provide such a valve which can be quickly and easily removed from the line in which it is installed, disassembled, cleaned, reassembled and reinstalled in the pipeline.

It is another object of this invention to provide such a valve having a minimum number of parts to thereby greatly simplify the construction and cleaning of the valve.

It is another object of this invention to provide a valve of the type described above having a valve seat which provides a seal between the valve and the pipeline in which it is installed.

It is another object of this invention to provide a ball valve in which the ball valve member or element is completely supported by the valve seat thus allowing the valve member to adapt itself properly within the cavity provided therefor in the seat when the valve is installed between the flanges in a pipeline.

It is another object of this invention to provide a valve seat for a ball valve which can be easily assembled around a ball valve member and which is forced into sealing engagement with the ball valve member when the valve is placed in service in a pipeline.

It is another object of this invention to provide a ball valve where the valve seat is forced into sealing engagement with the ball valve member when the valve is installed in a pipeline with uniform sealing pressure between the seat and the ball valve member adjacent the periphery of the opening through the valve member.

These and other objects, advantages, and features of this invention are obtained, in accordance with this invention, by providing a valve, adapted to be installed between two flanges in a pipeline, having a valve seat which extends beyond the valve body and is compressed longitudinally between the flanges and the valve member, when the valve is installed in a pipeline. By longitudinally compressing the seat, it is forced into sealing engagement with both the flanges and the valve member. Thus, one seal member provides all of the seals necessary to maintain the fluids carried by the pipeline within the valve and to also prevent the fluids from contacting the valve body and the other parts of the valve other than the valve member. For ease of assembly and to allow the opening through the seat and valve body to be exposed for cleaning purposes, the valve seat and body may be split longitudinally.

The invention has utility with any valve of the type described above, however, its advantages and features can be more fully realized in valves having spherically shaped valve elements. Therefore, a ball valve is shown in the drawings and will be described in detail below to illustrate one embodiment of the invention.

In the drawings:

FIG. 1 is a vertical cross sectional view of an embodiment of a ball valve constructed in accordance with this invention and installed between two opposed flanges in a pipeline to control the flow of fluids therethrough, the valve being shown in the open position;

FIG. 2 is an end view of the ball valve of FIG. 1 showing the two piece valve body disassembled with the remaining parts of the valve in place;

FIG. 3 is a partial sectional view showing portions of the ball valve member, valve stem, valve body, and valve seat as they would appear before the valve is installed in a pipeline, and illustrating how the valve seat extends beyond the valve body so that it will be compressed longitudinally by the flanges when the valve is installed in a pipeline; and FIG. 4 is an exploded isometric view of the various parts of the ball valve of this invention illustrating how the valve can be rapidly disassembled for complete thorough cleaning.

As shown in FIG. 1 the valve consists of a body 10 adapted to be installed between two flanges 11 and 12 which are connected into pipeline 9. Valve body 10 is held in position between the flanges by a plurality of threaded studs 13 which extend through holes (not shown) provided therefor in the flanges and along grooves 14 in the valve body. These studs 13 are provided with nuts 15 which when tightened hold the valve body and flanges in alignment.

Valve body 10 has an opening 16 therethrough in which valve seat 17 is located. The valve seat is made from a resilient, elastomeric material, such as rubber, either natural or synthetic, or an inert elastomeric material such as Teflon (polytetrafluoroethylene), where the valve is to be used to handle highly corrosive fluids. The seat is provided with a longitudinal opening 18 which forms a flowway through the valve and which is located with its longitudinal axis parallel to the longitudinal axis of opening 16 in the body. Actually, in the embodiment illustrated, these two openings are co-axial.

Valve seat 17 is also provided with a spherical cavity 19 of larger diameter than flowway 18 located approximately midway between the ends of and in position to intersect flowway 18. Located in spherical cavity 19 is ball valve member 20 which is also spherical in shape, preferably having a diameter such that it fits snugly in the cavity without exerting any large compressive forces thereon, when the valve is initially assembled.

Cavity 19 is located to position opening 21 through ball valve member 20 with its longitudinal axis lying in a plane parallel to the longitudinal axis of flowway 18. In the embodiment illustrated, opening 21, flowway 18 and the opening through pipeline 9 are co-axial when the valve is open so that fluids flowing through the pipeline can pass through the valve with a minimum of turbulence. Also, preferably, the diameter of flowway 18 and opening 21 is equal to the inside diameter of pipeline 9 for the same reason.

Ball valve member 20, being spherical, is free to rotate within spherical cavity 19. However, to maintain opening 21 in the ball in proper alignment with flowway 18 and also to provide means for opening and closing the valve, valve stem 22 is arranged to rotate the ball valve member on an axis perpendicular to the longitudinal axis of both the flowway and opening 21.

Valve stem 22 extends through cylindrical extension 23 on body 10 and is rotatably mounted therein. On its upper end it is provided with wrench flats 24 which can be engaged by a valve handle (not shown) or other means for rotating the valve stem in the body. The lower end of valve stem 22 has an enlarged section 25 which provides an upwardly facing shoulder 26 to engage downwardly facing shoulder 27 on the body and hold the valve stem in position against any forces which may be exerted thereon by internal pressure within the valve. The extreme lower end of valve stem 22 is provided with a key 28, which is of rectangular cross section which engages a similar shaped slot 29 provided therefor in the valve ball member to interengage the valve stem with the ball valve member and prevent relative rotation between the two so that rotation of the valve stem will cause rotation of the ball valve member. However, these two members are not connected to each other to the extent that a movement of one will influence the other greatly; in fact, preferably slot 29 is made large enough so that there will be considerable play between the slot and key 28 on the lower end of the valve stem to allow the ball valve member, which is completely supported by the seat, to float within the spherical cavity of the seat sufficiently to adjust itself as required to the cavity.

O-ring 30 is located in an appropriate groove in the enlarged section of the lower end of the valve stem to sealingly engage the wall of opening 31 provided in the valve seat for the stem. O-ring 30 provides a secondary seal should the initial seal between the valve seat and the ball valve member fail for one reason or another. Also, O-ring 30 prevents lubricants, which may be provided between the valve stem and the body, from leaking downwardly into the valve proper. A second O-ring 32 is installed in a groove in the upper end of the valve stem to maintain lubricants between the stem and body and also to prevent any dust or debris from getting between the valve stem and the valve body.

Since it is desirable not to use a valve seat having excessively thick walls, to provide ample wall thickness for the spherical cavity 19, the center section of valve seat 17 is provided with an outside annular ring 23. This ring provides ample material to enclose the spherical cavity 19 and also provides an anchor for the seat by engaging a similar shaped groove 34 provided therefor in the valve body. The interengagement of ring 33 on the valve seat and groove 34 in the valve body helps hold the valve seat in position in the valve body when the valve is closed and the valve seat is subjected to a differential pressure tending to force the elastomeric material of the valve seat past the ball in a downstream direction.

The valve seat is also provided with two diametrically opposed outwardly extending cylindrical bosses 35a and 35b which extend into cylindrical cavities 36a and 36b provided therefor in the valve body. These bosses furnish additional elastomeric material adjacent where the valve stem extends through the valve seat. Only one of these cylindrical bosses would be required since the valve stem extends only through one side of the valve seat. However, as will be explained below, in the illustrated embodiment, the valve seat is split longitudinally into two sections for ease of assembly, etc., and by arranging the sections to have the same external shape, one mold cavity can produce both sides of the valve seat, thus greatly reducing the molding cost. Boss 35b, of course, is not provided with a hole 31 as in boss 35a.

As stated above, the valve seat and the valve body are divided along a longitudinal plane into two sections. Thus, valve seat 17 consists of upper section 17a and lower section 17b. Each section is provided with a semicircular groove 18a and 18b, which when combined, provide a completely circular flowway 18 through the valve. To obtain a seal between these two seat sections, when they are installed in the valve body, the two sections are formed to have an outside diameter that is greater than the inside diameter of the valve body when it is assembled. This is shown in FIG. 2. Thus, when the valve body is assembled around the two sections of the valve seat the edge surfaces 37 and 38 of section 17b and the edge surfaces 39 and 40 of section 17a are forced into sealing engagement with each other. To help maintain these edges in alignment so that flowway 18 will be cylindrical, each pair of engaging edges is provided with a protrusion 41 and a cavity 42 which is shaped to receive the protrusion 41, which when forced into interengagement, resist relative lateral movement of the edges.

As stated above, valve body 10 is also divided into two sections, 10a and 10b, along a plane extending through the longitudinal axis of opening 16 through the body. These sections are held together by studs 43, which extend through openings 44 in body section 10b and engage tapped holes 45 provided therefor in body section 10a. Studs 43 thus hold the body assembled which, in turn, holds the remaining parts of the valve assembled. By simply removing these studs the valve can be completely broken down for cleanings. as shown in FIG. 4.

As shown in FIG. 3, valve seat 17 is longer than opening 16 through the body and extends outwardly beyond each end of the body. By arranging the seat in this manner, when the assembled valve is installed between opposing flanges in a pipeline, valve seat 17 will be compressed longitudinally between the flanges and the ball valve member, forcing it into sealing engagement with both flanges and the ball valve member. When the valve member is a ball, the sealing force between the seat and the member is uniformly distributed around the periphery of the flowway through the seat.

Seat 17 then provides the seal between the valve and the fittings between which it is installed and also a seat for sealingly engaging the valve member. Thus, fluids flowing through the valve are retained within flowway 18 and prevented from contacting the valve body, stem, etc. Also, with this arrangement, the valve ball member need not be forced into sealing arrangement with the valve seat, when the valve is assembled, which greatly simplifies the assembling of the valve. Further, since the seal is not established until the valve is installed, the valve can be preassembled and stocked on the shelf without any danger of the elastomeric material used in the seat becoming permanently set or cold flowing, thereby reducing the ability of the valve to seal against pressures. This is particularly advantageous where the seat is made from Teflon.

As shown in FIG. 4, the ball valve of this invention consists of very few parts and requires only the removal of two threaded studs to completely disassemble the valve after it has been removed from the pipeline. Once disassembled, the valve parts are easily washed. The embodiment illustrated is particularly easy to clean since the valve body and the valve seat both come apart into two sections allowing easy access to the inside passageway of each.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve adapted to be installed between flanges in a pipeline; comprising, a valve body including two sections, each having a groove therein, the grooves combining when the two sections are assembled to provide a passageway through the body; means for holding the two sections assembled; a valve seat of resilient, elastomeric material located in the passageway through the valve body, said seat having an outside diameter greater than the diameter of the passageway formed by the grooves thereby forcing the seat into sealing engagement with the body when the two sections of the body are assembled around the seat; said seat having an opening therein co-axial with the passageway through the body to provide a flowway through the valve and a cavity of circular cross-section intersecting the flowway; a valve member of circular cross-section, located in the flowway and extending into the cavity, having an opening therein whose longitudinal axis lies in the same plane as the longitudinal axis of the flowway; said seat being longer than the passageway in the body to thereby cause the seat to be compressed longitudinally when the valve is installed between flanges in a pipeline, forcing the seat into sealing engagement with the valve member; and a valve stem engaging the valve member and extending laterally of the flowway through the valve seat and valve body for rotating the valve member within the cavity.

2. The valve of claim 1 in which the valve seat is divided into two sections along a plane which passes through the center of the valve member.

3. The valve of claim 1 in which the valve member is provided with a non-circular opening and the valve stem is provided with a similar non-circular cross-sectional configuration to be located in the opening to allow rotation of the stem to be imparted to the valve member.

4. A valve comprising, a valve body having an opening therethrough, said body being divided into two sections along a plane parallel to the longitudinal axis of the opening through the body; means for releasably holding the two sections of the body assembled; a valve seat of resilient, elastomeric material located within the opening in the body in engagement with the walls thereof and having an opening therethrough located with its longitudinal axis parallel to the longitudinal axis of the opening in the body; said seat being divided into two separate sections which are held in sealing engagement by the body; said seat being longer than the opening in the body to cause the seat to be compressed longitudinally when the valve is installed in a pipeline between opposing flanges; said seat being further provided with a cavity of circular cross-section located to intersect the opening through the seat; a valve member of circular cross section located within the cavity; said valve member having an opening therethrough whose centerline lies in the same plane as the centerline of the opening through the seat; the diameter of the valve member being such that it is freely rotatable in the cavity in the seat before the valve is assembled in a pipeline but will be sealingly engaged by the seat when the seat is compressed longitudinally when the valve is installed between flanges in a pipeline; said seat and said body being further provided with co-axial, adjacent, lateral openings and a valve stem rotatably mounted in the lateral openings and in engagement with the valve member to rotate the valve member between a position with the centerline of its opening parallel to the centerline of the opening through the seat, opening the valve, and a position with its centerline perpendicular to the centerline of the opening through the seat closing the valve.

5. The valve of claim 4 in which the seat and the body are divided into two sections along a plane which extends through the longitudinal axis of the opening perpendicular to the longitudinal axis of the valve stem.

6. The valve of claim 5 in which the edges of the two sections of the valve seat which are held in sealing engagement by the body are provided with interengaging protrusions and groves to hold the edges in alignment in the valve body.

7. A ball valve adapted to be installed in a pipeline between flanges having opposed sealing faces, comprising a two-piece valve body having an opening therein; means for releasably holding the body assembled; a valve seat, located in the opening in the body in engagement with the walls thereof, having an opening therethrough which is co-axial with the opening in the body and a spherically shaped cavity, located midway between the ends of the seat, with the longitudinal axis of the opening in the seat passing through the center of the cavity; a ball valve member located in the cavity with an opening therethrough positioned with its longitudinal axis lying in the same plane as the longitudinal axis of the opening through the seat; and a valve stem engaging the ball valve member and extending through the body to a point exterior thereof to allow the position of the ball in the cavity to be changed by the valve stem; said valve body and valve seat each being divided into two sections along a plane which extends through the longitudinal axis of the opening through each member and perpendicular to the longitudinal axis of the valve stem, the valve seat being longer than the body and having an outside diameter larger than the diameter of the opening through the valve to cause the two sections of the seat to be forced into sealing engagement with each other when the valve body is assembled and to cause the valve seat to be compressed longitudinally when the valve is installed in a pipeline between two flanges to force the seat into sealing engagement with the flanges and the ball valve member.

8. The valve of claim 7 in which the valve seat is further provided with interengaging protrusions and grooves along the edges of the two sections which are held in sealing engagement by the body to thereby maintain the edges in alignment in the body and improve the seal between the edges.

References Cited by the Examiner

UNITED STATES PATENTS

| 2,905,197 | 9/1959 | Janes | 251—317 X |
| 3,041,036 | 6/1962 | McFarland | 251—317 X |
| 3,124,334 | 3/1964 | Szohatzky | 251—315 X |
| 3,157,190 | 11/1964 | Allen | 251—315 X |

FOREIGN PATENTS

| 567,554 | 12/1958 | Canada. |
| 511,225 | 1/1955 | Italy. |

M. CARY NELSON, *Primary Examiner.*

A. JAFFE, E. FEIN, *Assistant Examiners.*